United States Patent [19]
Foust

[11] Patent Number: 6,032,411
[45] Date of Patent: Mar. 7, 2000

[54] TREE SYRINGE

[76] Inventor: Victor Kermit Foust, P.O. Box 8579, Wichita, Kans. 67208

[21] Appl. No.: 09/096,846

[22] Filed: Jun. 11, 1998

Related U.S. Application Data

[60] Provisional application No. 60/057,994, Sep. 5, 1997.
[51] Int. Cl.[7] ..................................................... A01G 7/06
[52] U.S. Cl. ............................................................. 47/57.5
[58] Field of Search ................................... 47/57.5, 48.5; 222/82, 83, 319, 320

[56] References Cited

U.S. PATENT DOCUMENTS

| | | |
|---|---|---|
| 3,286,401 | 11/1966 | Mauget . |
| 4,365,440 | 12/1982 | Lenardson . |
| 4,989,366 | 2/1991 | DeVlieger . |
| 5,249,391 | 10/1993 | Rodgers ..................................... 47/57.5 |

*Primary Examiner*—Michael J. Carone
*Assistant Examiner*—Jeffrey L. Gellner

*Attorney, Agent, or Firm*—Robert O'Blinn

[57] ABSTRACT

The two piece tree syringe of the present invention can be used to inject a liquid agent into the living tissue of a tree. This tree syringe includes a barrel and a plunger. An hollow injection stem projects from the barrel. A passageway inside the hollow injection stem is separated from the interior of the barrel by a thin membrane in the barrel floor. The plunger is a double walled cylindrical container adapted to engage the barrel in a telescoping fashion. The drain stem is fixed to the inner wall of the plunger and can line up with and pierce the thin membrane in the barrel floor so that it can pass through the barrel floor and into the injection stem passageway. After the tree syringe is partially assembled and partially filled with a liquid agent, it is inserted into a hole drilled into the living tissue of a tree and compressed until the drain stem punctures the thin membrane in the barrel floor thus opening a passageway for almost all of the pressurized liquid agent to escape out through the injection stem and into the tree.

11 Claims, 1 Drawing Sheet

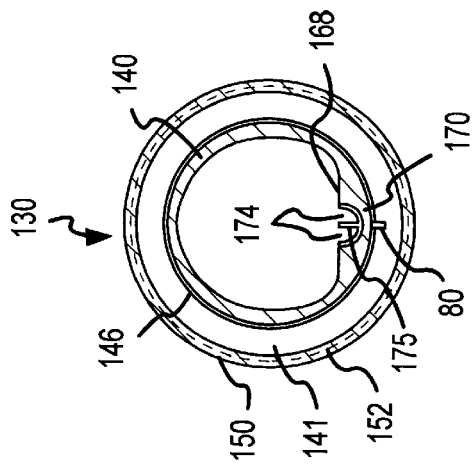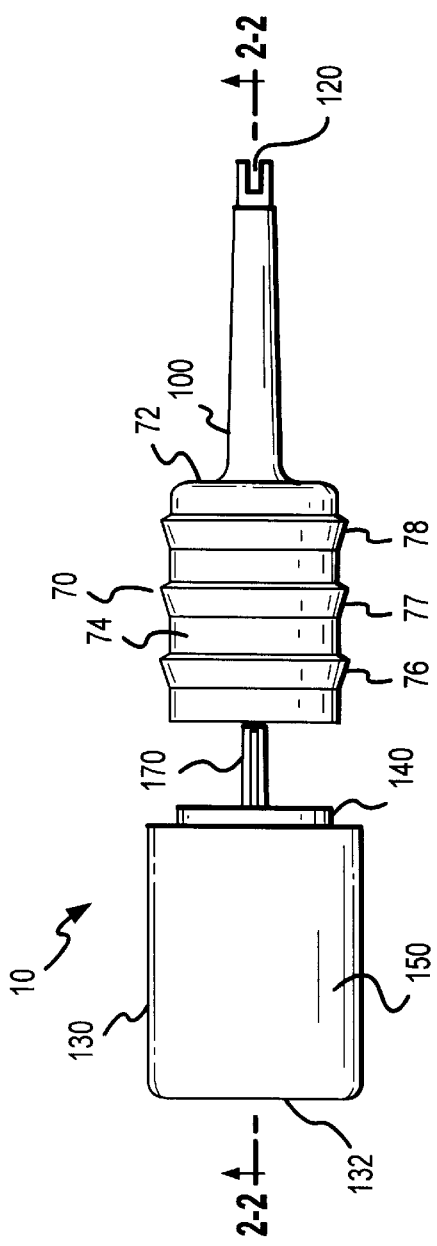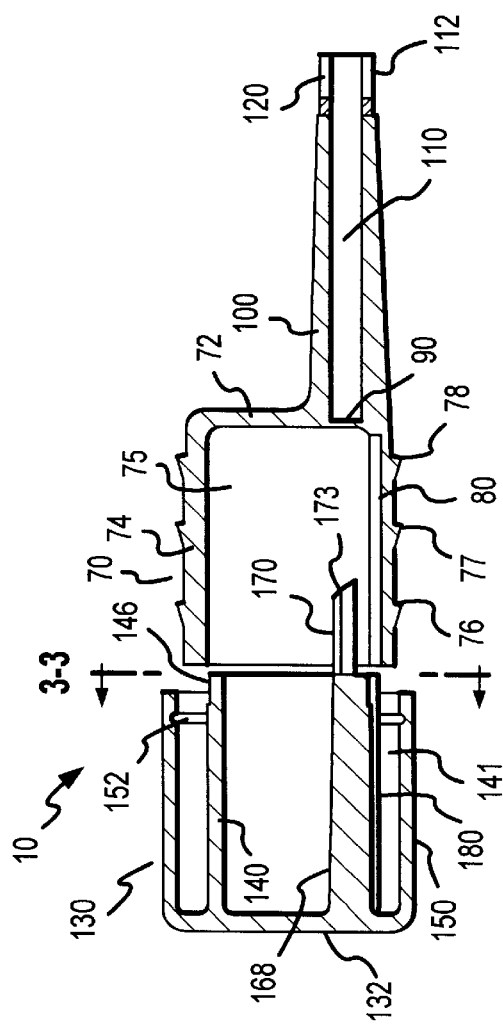

TREE SYRINGE

CROSS REFERENCES TO RELATED APPLICATIONS

This application claims the benefit of U.S. Provisional Patent Application No. 60/057,994 filed Sep. 5, 1997.

BACKGROUND OF THE INVENTION

1. Field of the Invention

The present invention relates to a disposable tree syringe for injecting liquid agents into the living tissue of a tree trunk.

2. Description of the Prior Art

Tree injection is an highly preferred method of introducing agents into trees. When a tree is sprayed with a treatment agent, only a very small portion of that treatment agent is absorbed by the tree while the remaining portion of the treatment agent is lost to the environment. When a tree is injected with a treatment agent, almost all of the injected agent is taken up by the tree and almost none of the treatment agent is lost to the environment. Consequently, tree injection is an highly efficient and environmentally safe means of introducing treatment agents into the living tissues of trees.

Tree injection can presently be accomplished with reusable tree injection systems and disposable tree syringes. Reusable tree injection systems have typically been complicated and costly apparatuses requiring extensive cleaning between uses. However, reusable tree injecting apparatuses can be used an indefinite number of times. Disposable tree syringes offer convenience and ease of use and can be used by one who is not inclined to invest in a tree injection system. Since disposable tree syringes can only be used for one injection, and since disposable tree syringes might be used by those who only occasionally perform tree injections, a successful tree syringe should be simple, inexpensive and easy to use.

A disposable tree syringe that is simple, inexpensive and easy to use has long been sought after in the prior art. U.S. Pat. No. 3,286,401 by Mauget discloses a telescoping tree syringe comprising a vertical, double walled container portion which receives a single walled cap portion. At the bottom of Mauget's double walled container portion is an horizontal passageway blocked by a gate member which is adapted to resist internal pressure. To use Mauget's syringe, a feeder tube is first inserted into an hole that is drilled into living tree tissue. The assembled container and cap containing a liquid agent is then compressed. Mauget's container and cap have features that lock them together when compressed. The compressed Mauget syringe is then engaged with the feeder tube so that the feeder tube forces open the gate member. The pressurized liquid agent in the Mauget syringe then escapes through the feeder tube and into the living tissue of the tree. Lenardson in U.S. Pat. No. 4,365,440 improves Mauget's syringe by adding circumferencial features such as grooves and ridges to the cap and container walls so that the cap and container engage and seal as they are pushed together.

An example of another type of disposable tree syringe is described and claimed by DeVliegert in U.S. Pat. No. 4,989,366. DeVliegert's syringe has a lower housing, a middle housing and an upper housing. DeVliegert's lower housing has a central, axial drain tube that is closed off from the interior of the lower housing by a thin membrane. The upper housing of DeVliegert's syringe has a cap portion and a cylendrical wall that telescopes inside the middle housing. A rubber ring seal is placed between corresponding radial end flanges extending from the middle and upper housings. The rubber seal provides an air tight seal between the upper and middle housings. DeVliegert's syringe is assembled for use by partially filling the combined middle and upper housings with a liquid agent and then gluing the middle housing to the lower housing. DeVliegert's syringe has a spike fixed to the inside wall of the upper housing cap that is adapted to break the thin membrane in the lower housing when the upper housing is pushed down into the middle housing.

The prior art tree syringes developed by Mauget and DeVliegert are admirable devices which allow the efficient and environmentally safe treatment of trees with liquid agents. However, these prior art tree syringes include several components and can be difficult to use. DeVliegert's tree syringe uses four parts which must be glued together and assembled before the syringe can be used. The Mauget type tree syringe has a separate feeder tube. Both Mauget's and DeVliegert's tree syringes are configured so that if a leak develops between the mating portions of the syringe, potentially toxic liquid agent can spray back in the direction of the operator. Accordingly, there still exists a need for a simpler, less expensive, disposable tree syringe that is comprised of only two parts, that is easy to use and that will, if it leaks, eject liquid agent away from the operator.

SUMMARY OF THE INVENTION

The tree syringe of the present invention satisfies this need by providing a simple, inexpensive, disposable tree syringe. The tree syringe of this invention includes a barrel and a plunger. The barrel is generally an open cylindrical container having a barrel wall, a barrel floor and an hollow injection stem extending from the barrel floor. The injection stem which is oriented normally to the barrel floor, is located adjacent to the barrel wall and has an internal passageway which is separated from the interior of the barrel by an easily breakable portion such as a thin membrane in the barrel floor. The end of the drain stem opposite the barrel floor is cylindrical and longitudinally notched so that it can fit tightly into a hole drilled into the living tissue of a tree. The plunger is a double walled container having a generally flat cap, an outer wall, an inner wall and a drain stem fixed to and extending away from the inner wall. The plunger inner wall is adapted to fit slidably and sealably inside the barrel wall and the plunger outer wall is adapted to fit slidably and sealably around the outside of the barrel wall. The drain stem is located so that it can align with and pierce the easily breakable portion of the barrel floor that separates the internal passageway of the injection stem from the interior of the barrel. The drain stem has a cross section adapted to fit inside and not completely obstruct the drain stem passageway. The end of the drain stem opposite the plunger cap is sufficiently sharp to pierce the easily breakable portion of the barrel floor.

The tree syringe of this invention can be employed using the following steps: (1) An operator partially fills the barrel with the liquid agent and assembles the tree syringe by sealably inserting the plunger into the barrel while aligning the drain stem with the thin membrane portion of the barrel floor. (2) The operator holds the tree syringe so that the drain stem is oriented lower than the other portions of the tree syringe and sloped downwardly. (3) The operator sealably inserts the end of the injection stem into a corresponding hole drilled into the living tissue of the tree. (4) Pneumatic pressure inside the syringe increases as the operator compresses the tree syringe by pushing the plunger into the. (5)

The operator continues to compress the syringe until the drain stem is forced through the easily breakable portion of the barrel floor thereby creating a continuous passageway for the liquid agent to escape out through the injection stem. (6) The operator further compresses the syringe until the plunger inner wall contacts the barrel floor thereby causing substantially all the pressurized liquid agent to be injected into the living tissue of the tree during a subsequent period of time.

As can be seen from the above description, the tree syringe of the present invention has the advantages of simplicity and ease of use. It includes only two parts, a barrel and a plunger. The tree syringe of the present invention accomplishes its function with only two parts because its novel configuration includes a double walled plunger and a single walled barrel. Because a double walled plunger is used, the element that pierces the thin membrane in the barrel, the drain stem, can be fixed to the plunger inner wall so that it can be shorter and reinforced. This shorter, reinforced drain stem can resist buckling even if the plunger and the plunger's integral drain stem is fashioned from a resilient, flexible material. Fashioning a plunger and its integral drain stem from a resilient, flexible material provides a plunger with walls that can stretch around the barrel wall and form an airtight, pressure resistant seal between the plunger walls and the barrel wall. Consequently, this novel arrangement provides a two piece syringe that seals when compressed and that also has the integral features of a barrel membrane that can be pierced by a drain stem projecting from the plunger. A second, very important advantage of the novel configuration of using a double walled plunger with a single walled barrel is that if a leak develops between the plunger and the barrel, the leaking liquid will be expelled away from the operator. In this way, the present invention provides a tree syringe that is simple, having only two pieces, and that is easy and safe to use. A pre-filled, pre-assembled disposable tree syringe of the present invention can be taken out into the field and used to inject a liquid agent into a tree with less effort, less expense and with less risk to the safety of the operator than prior art disposable tree syringes. Consequently, with the tree syringe of the present invention, the highly efficient and environmentally safe method of injecting trees with agents will become easier, less expensive, and therefore more widely practiced among those who wish to treat trees with agents.

BRIEF DESCRIPTION OF THE DRAWINGS

The following detailed description refers to the attached drawings in which:

FIG. 1 is a top view of the tree syringe of the present invention.

FIG. 2 is a sectional view of the tree syringe of the present invention taken from plane 2—2 of FIG. 1.

FIG. 3 is a sectional view of the tree syringe of the present invention taken from plane B—B of FIG. 2.

DETAILED DESCRIPTION OF THE PREFERRED EMBODIMENT

As will be better understood from the following description, the present invention is a two piece, disposable syringe for injecting a liquid agent into the living tissue of a tree. The present invention is ideally suited for introducing liquid agents such a fertilizers, fungicides, insecticides or even tree killing herbicides directly into the living tissue of a tree trunks. As can be generally seen in FIG. 1, the tree syringe 10 of the present invention includes a barrel 70 and a plunger 130. Barrel 70 further includes a barrel wall 74, a barrel floor 72 and a injection stem 100. Injection stem 100 has a cylindrical injection stem end 112. A notch 120 is cut into injection stem end 112. As can be further seen in FIG. 1, barrel wall 74 is encircled by a first circumferencial ridge 76, a second circumferencial ridge 77 and a third circumferencial ridge 78. As is also illustrated FIG. 1, plunger 130 includes a cap portion 132, an outer wall 150 and an inner wall 140. Drain stem 170 is fixed to and reinforced by inner wall 150 opposite cap 132.

FIG. 2 provides a cross section view of barrel 70 taken from plane A—A of FIG. 1. FIG. 2 shows that barrel wall 74 and a barrel floor 72 define a barrel cavity 75. Injection stem 100 has a passageway 110 that extends from a thin membrane 90 in barrel floor 72 at one end out through injection stem end 112 and notch 120. Stem end 112 is cylindrical so that it can seal tightly in a slightly smaller cylindrical hole drilled into the living tissue of a tree. Notch 120 gives stem end 112 added resilience so that stem end 112 tends to fit more tightly into the drilled hole. Notch 120 also provides openings for a liquid agent to escape into the tree's living tissue. Thin membrane 90 of barrel floor 72 separates passageway 110 from barrel cavity 75. It provides an easily breakable zone in barrel floor 72.

Referring again to FIG. 2, plunger 130 includes a cap 132, an inner wall 140 and an outer wall 150. Outer wall 150, inner wall 140 and cap 132 define an annular cavity 141 that surrounds inner wall 140. Inner wall 140 is adapted to fit tightly inside barrel wall 74 and outer wall 150 is adapted to fit tightly around the outside of the barrel wall 74. A groove 152 encircles the inside forward edge of outer wall 150 and is adapted to catch circumferencial ridges 76, 77 and 78 of barrel 70. Because circumferencial ridges 76, 77 and 78 each have a ratchet like cross section, they can be pushed past groove 152 as plunger 130 is pressed into barrel 70. However, because ridges 76, 77 and 78 each have ratchet like cross sections, it is very difficult to pull plunger 130 away from barrel 70 once the two components are engaged. The inner surface of outer wall 150 of plunger 130 is adapted to transitionally interfere and form an air-tight seal with circumferencial ridges 76, 77 and 78 of barrel 70. More particularly, outer wall 150 is adapted to stretch or deform as it engages circumferencial ridges 76, 77 and 78 so that a pressure resistant, air tight seal is formed between plunger 130 and barrel 70. As groove 152 catches circumferencial ridges 76, 77 and 78 in succession and as outer wall 150 continues to stretch as each of the ratchet shaped ridges 76, 77 and 78 are engaged, plunger 130 becomes sealed more tightly and locked more tightly into barrel 70, until plunger 130 is completely and permanently pressed into barrel 70. As should be apparent to those skilled in the art, other means, such as rubber gaskets or members that expand and seal under pressure could be used to create a seal between barrel 70 and plunger 130.

As can be further seen in FIG. 2, drain stem 170 of plunger 130 projects from a flat portion 168 of inner wall 140 and is positioned so that it can be aligned with injection stem 100 of barrel 70. Drain stem 170 has a sharp cutting end 173 which is adapted to puncture thin membrane 90 of barrel 70. Drain stem 170 is adapted to fit inside passageway 110 of injection stem 100 without blocking passageway 110. Drain stem 170 can be relatively short and thus resistant to buckling because it projects from the end of inner wall 140. Yet, even though drain stem 170 is relatively short, it can still easily reach and puncture thin membrane 90 of barrel 70 as will be better understood from the description below.

FIG. 3, a cross section view taken from plane B—B of FIG. 2, shows further details of plunger 130 and more particularly shows further details of drain stem 170. As can be seen in FIG. 3, channels 174 run the length of drain stem 170. Channels 174 also extend into the flat portion 168 of inner wall 150 to facilitate drainage. Channels 174 are divided by a stiffening flange 175 which further strengthens drain stem 170 against buckling.

Proper radial and axial alignment between barrel 70 and plunger 130 ensures that drain stem 170 of plunger 130 aligns with injection stem 100 of barrel 70 so that drain stem 170 can puncture thin membrane 90 of barrel 70. Proper radial and axial alignment between barrel 70 and plunger 130 also ensures that barrel 70 and plunger 130 smoothly and completely seal and lock as they are pushed together. Barrel 70 and plunger 130 include features which guide and align the two components radially and axially as they are engaged. Proper radial alignment can be accomplished by placing corresponding longitudinal features in barrel 70 and plunger 130. As can be seen in FIG. 2, radial alignment is accomplished by providing barrel 70 with a barrel guide groove 80 and plunger 130 with a plunger guide flange 180. Barrel guide groove 80 is positioned lengthwise along the inner surface of barrel wall 74. Plunger guide flange 180 that fits barrel guide groove 80 also runs lengthwise along the outer surface of plunger inner wall 140. When plunger 130 engages barrel 80, the two corresponding longitudinal features, barrel guide groove 80 and plunger guide flange 180 engage to ensure proper radial alignment. Axial alignment between the two components is accomplished by placing a recessed feature around one of the surfaces of the components. In this preferred embodiment, the outer surface of plunger inner wall 140 includes a recessed zone 146 that is adapted to accept the inner surface of barrel wall 74. When plunger 130 engages barrel 70, barrel wall 74 first seats in recessed zone 146 to axially align plunger 130 with barrel 70.

Guide groove 80 and guide flange 180 shown in FIG. 2 are not necessary to the function of the invention. If guide groove 80 and guide flange 180 were removed from FIG. 2, the resulting tree syringe would have a plunger inner 140 wall that could form a tight seal with the inside surface of the barrel wall 74. If such a plunger inner wall 140 is able to form a tight seal with the inside surface of barrel wall 74, it would then even be possible to define a plunger with only one wall. The disadvantage of removing guide groove 80 and guide flange 180 would be that plunger 130 and barrel 70 would be more difficult to align so that drain stem 170 of plunger 130 aligns with injection stem 100.

The placement of features such as plunger guide flange 180 and barrel guide groove 80 can be changed so that a groove is disposed in plunger 80 and a flange is disposed in barrel 70. The placement of guide flange 180 and groove 80 must only be corresponding in the sense that they are placed on opposing surfaces of plunger 130 and barrel 70. It does not matter which opposing surfaces are selected so long as guide flange 180 is received by groove 80 when plunger 130 is inserted into barrel 70. In the same way, it may also be possible to dispose a circumferencial ridge or set of circumferencial ridges shaped like circumferencial ridges 76, 77 and 78 of barrel 70, on the inner surface of outer wall 150 of plunger 130, or on the outside surface of inner wall 140 of plunger 130 or even on the inside surface of barrel wall 74 so long as the opposite surface from the surface selected is smooth and resilient to allow the at least one circumferencial ridge to effect a seal between plunger 130 and barrel 70. Such alternate placements of these various features should be considered within the scope of the present invention. The placement of these features as shown in FIG. 1, FIG. 2 and FIG. 3 is considered to be the best mode of placement of these features.

It should be evident to the skilled reader that both barrel 70 and plunger 130 would be best fashioned by injection molding a suitable plastic material which would be capable of resisting chemical agents commonly used in the treatment of trees and which would have the needed mechanical properties of strength and resilience. For example, using a medium density polyethylene, would produce a plunger 130 having an outer wall 150 that can expand around and seal with circumferencial ridges 76, 77 and 78 of barrel 70 while imparting enough strength to drain stem 170 so that it can puncture thin membrane 90 of the barrel 70. After selecting a material it is important for those skilled in the art of fashioning injected molded plastic components to select appropriate dimensions for various features of tree syringe 10. For example, when using a medium density polyethylene material for a tree syringe having a barrel 70 with a diameter of about 30 mm, plunger outer wall 150 might have a preferred thickness of approximately 1.5 mm. In this example, circumferencial ridges 76, 77 and 78 all could have a preferred radial height of about 0.7 mm and thin membrane 90 of barrel 70 could have a preferred thickness of about 0.35 mm. These are only example dimensions. As can be readily understood by those skilled in the art of fashioning injected molded plastic components an infinite number of appropriate combinations of material properties and feature dimensions could be selected to define a functional tree syringe such a tree syringe 10. Any one of such appropriate combinations would need to allow an air tight seal to be formed between plunger 130 and barrel 70, and provide an drain stem 170 capable of puncturing a thin membrane 90 without buckling.

The process for using tree syringe 10 generally includes the four steps of assembling a partially filled tree syringe, drilling a suitable hole in the living tissue of a tree, inserting the tree syringe injection stem into the drilled hole and compressing the tree syringe to inject the liquid agent into the tree. An operator can partially fill and assemble tree syringe 10 by partially filling tree syringe barrel cavity 75 with a liquid agent and then mating plunger 130 with barrel 70 while slidably engaging plunger guide flange 180 with barrel guide groove 80. The partial assembly is completed when groove 152 of plunger 130 catches first circumferencial ridge 76 of barrel 70. A suitable hole should be drilled into a tree trunk which is slightly smaller in diameter than injection stem end 112. The suitable hole should slope down as it enters the tree. A suitable hole would also be as shallow as possible and drilled into a root flare of a deciduous tree or about 1.4 meters above the ground on a conifer. Such a suitable hole should not be drilled into a valley between root flares on a deciduous tree. It is important that tree syringe 10 be oriented so that the injection stem 100 is below the rest of the tree syringe 10 when it is inserted into the drilled hole. In this way, the liquid agent will drain completely out of the syringe 10 when it is compressed. After tree syringe 10 is inserted into the above describe hole by inserting injection stem end 112 into the hole, tree syringe 10 is compressed by pushing plunger 130 into barrel 70. As plunger 130 is pushed into barrel 70, circumferencial feature 142 successively engages second and third circumferencial ridges 77 and 78. Also, immediately after groove 152 engages second circumferencial ridge 77, drain stem 170 punctures thin membrane 90. At this point the pressurized liquid agent in tree syringe 10 begins to drain out through channels 174 in drain stem 170, escape through the newly created puncture in thin membrane 90, flow out through injection stem 100 and flow into the living tissue of the tree to be absorbed and taken up by living tissue of the tree. As the injection process continues, plunger 130 is fully inserted into barrel 70. When plunger 130 is fully inserted into barrel 70, inner wall 140 of plunger 130 contacts barrel floor 72. Pressurized liquid agent may continue to flow out into the living tissue of the tree even after plunger 130 is fully inserted into barrel 70. Accordingly, the fully compressed tree syringe 10 is left inserted into the tree for a suitable period of time to allow the living tree tissue to take up as much of the liquid agent as possible before syringe 10 is removed and discarded.

As can be seen from the forgoing description, the tree syringe of the present invention provides a simple, reliable and safe means for injecting a liquid agent into a tree. Its novel configuration provides a self sealing, two piece design which can be partially filled with a liquid agent and assembled for later use. When partially filled and assemble, the tree syringe of the present invention, becomes a device that can be used in the field with an absolute minimum of effort and with a high degree of safety. This novel configuration allows tree injections to be conducted with less cost and effort and should result in a more widespread use of the method of injecting trees with treatment agents. Consequently, with the introduction of the tree syringe of the present invention, the inefficient, wasteful and environmentally destructive practice of spraying trees with treatment agents should become less prevalent as more tree care specialists use the present tree syringe to practice the cost effective, simple and efficient method of directly injecting trees with treatment agents.

The skilled reader, in view of this specification may envision numerous modifications and variations of the above disclosed preferred embodiment. Accordingly, the reader should understand that these modifications and variations, and the equivalents thereof, are within the spirit and scope of this invention and the scope of the claims.

I claim:

1. A tree syringe for injecting a liquid agent comprising: a barrel and a plunger,
   the barrel having a floor, a barrel wall and an injection stem, the barrel wall and the barrel floor defining the interior of the barrel, the injection stem protruding from the barrel floor away from the interior of the barrel, the injection stem having a passageway therethrough, the barrel floor having a thin membrane separating the injection stem passageway from the interior of the barrel,
   the plunger having a cap, a plunger wall and a drain stem, the plunger wall adapted to fit slidably and sealably inside the barrel wall, the drain stem mounted to the plunger wall and positioned to align with the thin membrane of the barrel floor, the drain stem adapted to break the thin membrane of the barrel floor when pushed therethrough, the drain stem also positioned and adapted to pass into the injection stem passageway, the drain stem also adapted to fit inside the injection stem passageway without blocking the injection stem passageway,
   whereby when the barrel is partially filled with the liquid agent and the plunger is inserted into the barrel with the drain stem of the plunger aligned with injection stem passageway of the barrel, and if the plunger is further inserted into the barrel, the drain stem pierces the thin membrane of the barrel floor and the liquid agent is expelled out through the injection stem.

2. A tree syringe for injecting a liquid agent comprising: a barrel and a plunger,
   the barrel having a floor, a barrel wall and an injection stem, the barrel wall and the barrel floor defining the interior of the barrel, the injection stem protruding from the barrel floor away from the interior of the barrel adjacent to the barrel wall, the injection stem having a passageway therethrough, the barrel floor having a thin membrane separating the injection stem passageway from the interior of the barrel,
   the plunger having a cap, an inner plunger wall, an outer plunger wall and a drain stem, the cap, the inner plunger wall, and the outer plunger wall defining a double walled container, the inner plunger wall adapted to fit slidably and sealably inside the barrel wall, the outer plunger wall adapted to fit slidably and sealably around the outside of the barrel wall, the drain stem mounted to the inner plunger wall and positioned to align with the thin membrane of the barrel floor, the drain stem adapted to break the thin membrane of the barrel floor when pushed therethrough, the drain stem also positioned and adapted to pass into the injection stem passageway, the drain stem also having a cross section smaller than the injection stem passageway whereby the drain stem would not completely block the injection stem passageway if it would pass into the injection stem passageway,
   whereby when the barrel is partially filled with the liquid agent and the plunger is inserted into the barrel with the drain stem of the plunger aligned with injection stem passageway of the barrel, and if the plunger is further inserted into the barrel, the drain stem pierces the thin membrane of the barrel floor and the liquid agent is expelled out through the injection stem.

3. The tree syringe of claim 2 further comprising,
   a longitudinal guide flange disposed in the outer surface of the inner plunger wall and a corresponding guide groove disposed in the inside surface of the barrel wall for receiving the guide flange so that plunger and the barrel can be easily aligned when the plunger is inserted into the barrel.

4. The tree syringe of claim 2 wherein,
   at least one circumferencial ridge is disposed about the outside surface of the barrel wall, the at least one circumferencial ridge adapted to engage the inside surface of the plunger outer wall whereby a tight seal is formed between the plunger and the barrel.

5. The tree syringe of claim 2, further comprising:
   at least one circumferencial ridge disposed about the outside surface of the barrel wall, the at least one circumferencial ridge adapted to engage the inside surface of the plunger outer wall whereby a tight seal is formed between the plunger and the barrel,
   a circumferencial feature disposed about the inside surface of the plunger outer wall for catching the at least one circumferencial ridge as the circumferencial ridge on the outside surface of the barrel wall passes over the circumferencial feature whereby the plunger is locked into the barrel as it is inserted into the barrel.

6. The tree syringe of claim 2, further comprising a recessed zone disposed about the outer surface of the plunger inner wall adapted to accept the barrel wall whereby the plunger and the barrel are axially aligned when the plunger is first inserted into the barrel.

7. The tree syringe of claim 2, further comprising:
   a recessed zone disposed about the outer surface of the plunger inner wall adapted to accept the barrel wall whereby the plunger and the barrel are axially aligned when the plunger is first inserted into the barrel, at least one circumferencial ridge disposed about the outside surface of the barrel wall, the at least one circumferencial ridge adapted to engage the inside surface of the plunger outer wall whereby a tight seal is formed between the plunger and the barrel.

8. The tree syringe of claim 2, further comprising:

a recessed zone disposed about the outer surface of the plunger inner wall adapted to accept the barrel wall whereby the plunger and the barrel are axially aligned when the plunger is first inserted into the barrel, at least one circumferencial ridge disposed about the outside surface of the barrel wall, the at least one circumferencial ridge adapted to engage the inside surface of the plunger outer wall whereby a tight seal is formed between the plunger and the barrel, a circumferencial feature disposed about the inside surface of the plunger outer wall for catching the at least one circumferencial ridge as the circumferencial ridge on the outside surface of the barrel wall passes over the circumferencial feature whereby the plunger is locked into the barrel as it is inserted into the barrel.

9. The tree syringe of claim 2, further comprising:

a longitudinal guide flange disposed in the outer surface of the inner plunger wall and a corresponding guide groove disposed in the inside surface of the barrel wall for receiving the guide flange so that plunger and the barrel can be easily aligned when the plunger is inserted into the barrel, a recessed zone disposed about the outer surface of the plunger inner wall adapted to accept the barrel wall whereby the plunger and the barrel are axially aligned when the plunger is first inserted into the barrel, at least one circumferencial ridge disposed about the outside surface of the barrel wall, the at least one circumferencial ridge adapted to engage the inside surface of the plunger outer wall whereby a tight seal is formed between the plunger and the barrel, a circumferencial feature disposed about the inside surface of the plunger outer wall for catching the at least one circumferencial ridge as the circumferencial ridge on the outside surface of the barrel wall passes over the circumferencial feature whereby the plunger is locked into the barrel as it is inserted into the barrel, a longitudinal guide flange disposed in the outer surface of the inner plunger wall and a corresponding guide groove disposed in the inside surface of the barrel wall for receiving the guide flange so that plunger and the barrel can be easily aligned when the plunger is inserted into the barrel.

10. A method for injecting a liquid agent into the living tissue of a tree comprising the steps of:

(a) obtaining a tree syringe for injecting a liquid agent into the living tissue of a tree having a barrel and a plunger, where the barrel has a floor, a barrel wall and an injection stem, the barrel wall and the barrel floor defining the interior of the barrel, the injection stem protruding from the barrel floor away from the interior of the barrel, the injection stem having a passageway therethrough, the barrel floor having a thin membrane separating the injection stem passageway from the interior of the barrel, the plunger including a cap, a plunger wall and a drain stem, the plunger wall adapted to fit slidably and sealably inside the barrel wall, the drain stem mounted to the plunger wall and positioned to align with the thin membrane of the barrel floor, the drain stem adapted to break the thin membrane of the barrel floor when pushed therethrough, the drain stem also positioned and adapted to pass into the injection stem passageway, the drain stem also having an open cross section so that the drain stem does not completely block the injection stem passageway when the drain stem is inserted into the injection stem passageway, (b) partially filling the barrel of the tree syringe with the liquid agent, (c) inserting the plunger into the barrel with the drain stem aligned with the thin membrane of the barrel floor and the injection stem passageway, (d) inserting the injection stem into a hole drilled into the living tissue of the tree, (e) compressing the tree syringe so that the plunger is inserted into the barrel until the drain stem is forced through the thin membrane of the barrel floor, (f) further compressing the tree syringe while the liquid agent flows out of the tree syringe, through the injection stem and into the living tissue of the tree whereby the liquid agent is completely and efficiently injected into the living tissue of the tree.

11. The method of claim 10 wherein the tree syringe obtained in step (a) further comprises a plunger having a second outer wall in addition to the first plunger wall, the first plunger wall adapted to fit slidably and sealably inside the barrel wall, the second outer plunger wall is adapted to fit slidably and sealably around the outside of the barrel wall.

* * * * *